(12) United States Patent
Kennett et al.

(10) Patent No.: US 11,850,519 B2
(45) Date of Patent: Dec. 26, 2023

(54) TRACKING IN-GAME EVENTS AND GENERATING EVENT REPORTS ACROSS MULTIPLE GAMING APPLICATIONS

(71) Applicant: Microsoft Technology Licensing, LLC, Redmond, WA (US)

(72) Inventors: Daniel Gilbert Kennett, Bellevue, WA (US); Mark Edward Rabold, Renton, WA (US)

(73) Assignee: Microsoft Technology Licensing, LLC

( * ) Notice: Subject to any disclaimer, the term of this patent is extended or adjusted under 35 U.S.C. 154(b) by 188 days.

(21) Appl. No.: 17/350,825

(22) Filed: Jun. 17, 2021

(65) Prior Publication Data

US 2022/0401843 A1    Dec. 22, 2022

(51) Int. Cl.
*A63F 13/75* (2014.01)
*A63F 13/77* (2014.01)
*H04L 67/10* (2022.01)

(52) U.S. Cl.
CPC .............. *A63F 13/77* (2014.09); *A63F 13/75* (2014.09); *H04L 67/10* (2013.01)

(58) Field of Classification Search
CPC ...................................................... A63F 13/75
See application file for complete search history.

(56) References Cited

U.S. PATENT DOCUMENTS

| | | | |
|---|---|---|---|
| 11,228,504 B2 * | 1/2022 | Puttur | G06F 11/3636 |
| 11,458,405 B1 * | 10/2022 | Welch | A63F 13/35 |
| 2020/0346121 A1 | 11/2020 | Beaumont et al. | |
| 2020/0353363 A1 * | 11/2020 | Slovak | A63F 13/355 |
| 2021/0038979 A1 * | 2/2021 | Bleasdale-Shepherd | G07F 17/3225 |
| 2021/0162300 A1 | 6/2021 | Mueller et al. | |
| 2021/0232907 A1 * | 7/2021 | Pardeshi | G06N 3/08 |
| 2021/0370183 A1 * | 12/2021 | Dorn | A63F 13/79 |
| 2022/0249957 A1 * | 8/2022 | Kaufman | A63F 13/79 |
| 2022/0410015 A1 * | 12/2022 | Risi | A63F 13/67 |

FOREIGN PATENT DOCUMENTS

CN          110675370 A        1/2020

OTHER PUBLICATIONS

"International Search Report and Written Opinion Issued in PCT Application No. PCT/US22/029932", dated Sep. 9, 2022, 13 Pages.

* cited by examiner

*Primary Examiner* — Jay Trent Liddle
(74) *Attorney, Agent, or Firm* — RAY QUINNEY & NEBEKER P.C; James Bullough

(57) ABSTRACT

The present disclosure relates to systems, methods, and computer-readable media for identifying a variety of events that occur within a gaming session and generating event reports based on the identified events. For example, a gaming service (e.g., a cloud gaming server) can leverage content analysis and event recognizer services on a cloud computing system to detect one or more in-game events based on gaming content (e.g., video content, audio content, controller inputs) that is delivered to a client system. Systems described herein can train and implement event recognizers trained to track various in-game events across multiple gaming applications. Based on the tracked events, the systems described herein can generate event reports for events, individual users, and groups of users of the cloud computing system.

20 Claims, 9 Drawing Sheets

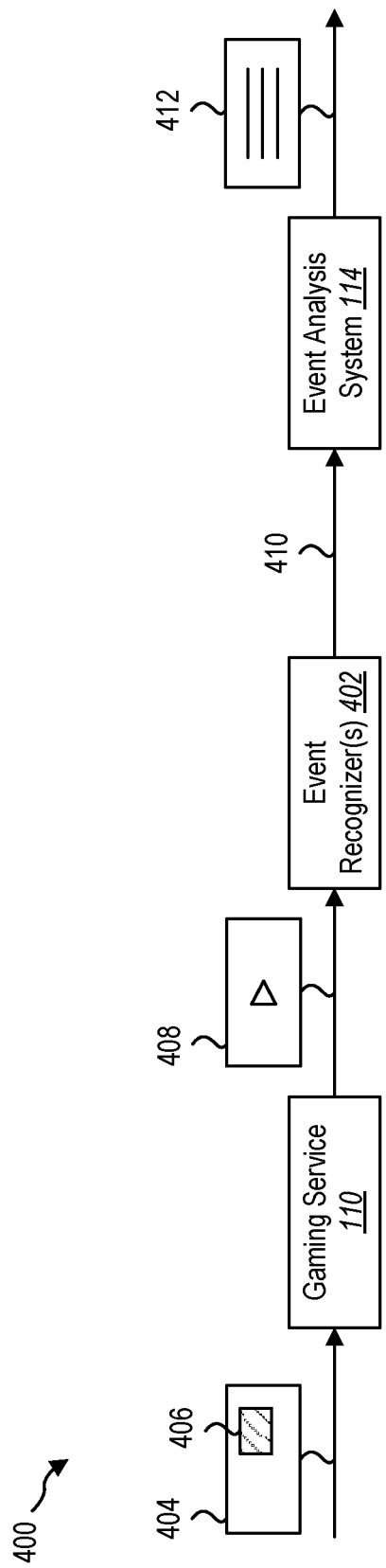

TRACKING IN-GAME EVENTS AND GENERATING EVENT REPORTS ACROSS MULTIPLE GAMING APPLICATIONS

BACKGROUND

Recent years have seen a precipitous rise in the use of remote computing resources to generate, process, and provide multi-media content. For example, cloud computing systems are now generating and delivering gaming content to a wide variety of local devices having a variety of computing and display capabilities. As video games and other content have become higher quality and as network bandwidth has increased, cloud-based gaming has become a more and more common platform for delivering gaming content to individuals.

By way of example, where a lot of popular gaming content used to be available via a select few gaming consoles specifically developed for generating and delivering gaming content from a particular set of gaming titles, cloud-based gaming has provided an avenue for gaming content from multiple publishers to be delivered via the same client device(s). In addition, different versions of gaming titles that were conventionally only playable on different systems are often made accessible via a single client system as a result of cloud-gaming. While increased access and ready availability to a larger collection of gaming titles has increased popularity of cloud-based gaming, there exist a number of difficulties associated with maintaining or otherwise increasing engagement with a wide variety of gaming applications.

For example, while cloud-based gaming provides ready-access to many gaming applications, tracking usage of gaming application is generally limited to capabilities provided by the software of the gaming applications themselves. For example, many gaming applications have in-game achievements and mechanisms for tracking various statistics; however, these conventional mechanisms are specific to certain games or platforms and are often limited to what was originally developed when the gaming application was previously shipped. As a result, gaming applications for older titles are often limited to original capabilities and new games become static when they are shipped. Moreover, gaming applications for different publishers often provide non-uniform metrics and mechanisms for tracking telemetry and thus provide limited context for entities that may be interested in how games are played by end-users.

These and other problems exist with regard to tracking occurrence of various in-game events and providing reports of those tracked events.

BRIEF DESCRIPTION OF THE DRAWINGS

FIG. 4 illustrates an example implementation in which an event reporting system tracks an in-game event for purposes of diagnosing unintended occurrences within gaming sessions for a gaming application.

DETAILED DESCRIPTION

Figure 1:
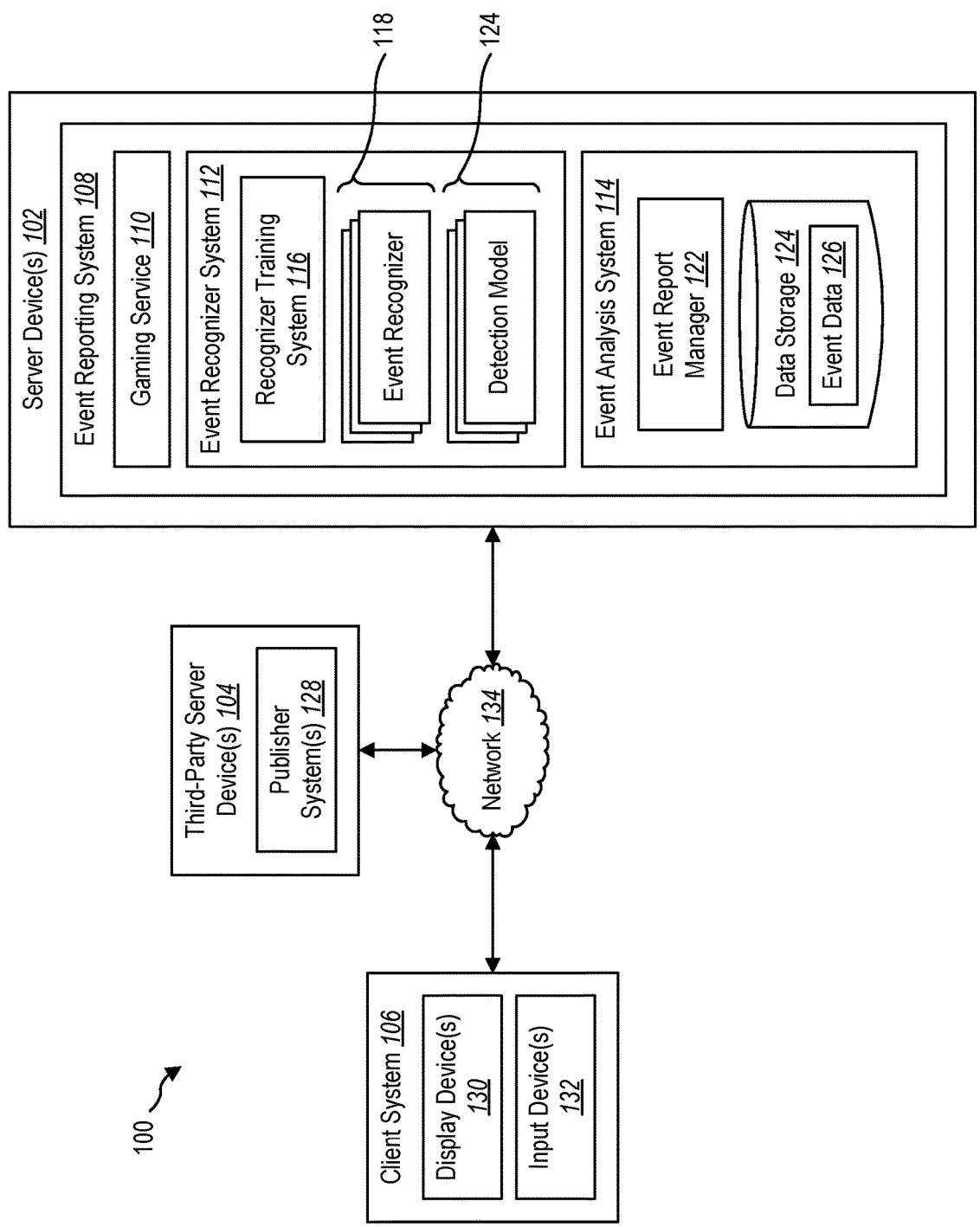
FIG. 1 illustrates an example implementation of an event reporting system for tracking in-game events and providing an event report.

The present disclosure relates generally to an event reporting system having event recognizers implemented thereon that are trained to detect a wide variety of in-game events on one or across multiple gaming applications in a way that does not interrupt the gaming experience of users of a cloud-based gaming service. For example, as will be discussed in further detail below, the event reporting system may be used to track one or more event recognizers to detect instances of an event (e.g., an in-game event) based on gaming content that is received for a given gaming session. Once trained, the event recognizers may be applied to gaming content associated with any number of gaming applications to detect instances of the event across the various gaming sessions (and across multiple gaming applications). The event reporting system may compile, store, or otherwise maintain the tracked instances of the events and associated information and generate an event report for an event, an individual user, or for multiple users.

As a first illustrative example, in one or more embodiments, an event reporting system may receive a request to track instances of an event being associated with in-game occurrences across a plurality of gaming applications. The event reporting system may identify a first event recognizer having been trained to detect instances of the event based on individual detection model(s) that have been trained to output one or more signals based on consumable gaming content (e.g., video content, audio content, controller inputs) associated with a given gaming session. As will be discussed below, the event reporting system can apply the event recognizer to different gaming content associated with different gaming applications (e.g., gaming content for different gaming sessions of different video games) to detect one or more instances of the event across the different gaming applications. The event reporting system can additionally generate and provide an event report including information about the tracked instances of the event.

As a second illustrative example, in one or more embodiments, an event reporting system may identify an event for a gaming application being associated with in-game occurrences within gaming sessions of the gaming application. This may include unexpected occurrences such as in-game defects, in-game artifacts, in-game exploits, and other undesirable occurrences within gaming sessions of the application. Upon identifying the type of event, the event reporting system may cause a recognizer to be trained to detect instances of the event. Once trained, the event recognizer may be applied to gaming content from a plurality of gaming sessions to track instances of the event across gaming sessions of the gaming application. Similar to one or more embodiments mentioned above, the event reporting system may then generate and provide an event report including information about the tracked instances of the event.

The present disclosure includes a number of practical applications that provide benefits and/or solve problems associated with tracking in-game events and providing event reports including information associated with the tracked in-game events. Some example benefits are discussed in further detail below. It will be understood that these examples are provided by way of example, and a significant number of additional benefits and practical applications are realized by features and functionalities described herein in connection with the event reporting system and associated components.

As a first example, the systems described herein facilitate tracking events across multiple gaming applications using an event recognizer that has been trained to detect similar events within gaming sessions for multiple gaming applications. For example, by training models of event recognizers to evaluate video content, one or more event recognizers can be trained to recognize events across multiple applications, including applications of different titles and/or associated with different publishers. For example, an event recognizer may include one or more models trained to detect instances of an event on gaming sessions for a first gaming application with the same or different models of the event recognizer being trained to identify instances of the event (or similar type of event) on gaming sessions for a second gaming application. As will be discussed below, this can be done without modifying software code or programming of the underlying gaming applications.

In addition to being trained to detect events across gaming applications, one or more embodiments described herein facilitate detecting events for any number of end-users associated with a variety of hardware and systems. In particular, as indicated above, because the event recognizers are trained to recognize events based on an evaluation of consumable gaming content, the event recognizers described herein can detect events on different gaming systems, including mobile gaming systems, personal computer (PC) gaming systems, gaming consoles, etc. Indeed, in one or more embodiments, the event recognizers can be trained with no consideration or specific knowledge of the specific hardware platforms or content publishers associated with the corresponding gaming content.

In addition to the above-flexibility in detecting events across multiple applications and systems, the event reporting system includes features and functionality that enable any number of trained event recognizers to be applied to gaming content without interrupting a gaming experience for users of client systems. For example, in one or more embodiments, the event recognizers may be applied to gaming content after the gaming content has been provided to client system(s) and consumed by individual users. In addition, even where the event recognizers are applied to gaming content that is concurrently being streamed to client system(s), the systems described herein avoid using client system bandwidth and/or local processing resources by leveraging computing capabilities and resources of the cloud. In this way, the event reporting system can apply any number of event recognizers to gaming content to detect any number of different types of events without consuming limited bandwidth or processing resources of client system hardware.

Use of the event recognizers and services for generating event reports as described herein further provide specific benefits related to a wide variety of use-cases. For example, because the event reporting system is configured to train event recognizers to detect any combination of detectable signals, the event reporting system can be implemented in a number of use-cases ranging from identifying in-game events indicative of user-exploits, tracking frequency of in-game events associated with different in-game bugs, undesired artifacts, or other unexpected events. Other embodiments may involve implementing multiple event recognizers to provide a comprehensive report for a single gaming session (e.g., game-film report for competitive gamers) and/or a comprehensive report for one or multiple players that provide relevant information for a gaming career that spans over a variety of different gaming titles and genres. Additional information in connection with some of these use-cases within the environment of the event reporting system will be discussed in further detail below.

In each of the above examples, the systems described herein facilitate tracking of in-game events in a variety of ways without requiring expensive and time-consuming software development of the underlying software code for the gaming application(s). Rather, as will be discussed in further detail below, an event recognizer may include one or more detection models that are trained to detect signals indicative of a particular event based on analysis of gaming content (e.g., video content). Because the recognizers are trained to detect various events based on gaming content (e.g., rather than underlying code or back-end processing data), the systems described herein can be trained to detect events and generate event reports without requiring access to software, source code, or processing signals of the gaming application. Moreover, because the recognizers can be implemented on server devices of the cloud, any number of recognizers can be applied to a stream of gaming data without consuming bandwidth or processing of a gaming server that is hosting or otherwise providing the gaming content to a client system.

As illustrated in the foregoing discussion, the present disclosure utilizes a variety of terms to described features and advantages of the systems, methods, and computer-readable media described herein. Additional detail is now provided regarding the meaning of some of these terms.

As used herein, a "cloud computing system" refers to a network of connected computing devices that provide various services to computing devices (e.g., customer devices). For example, a cloud computing system may include a collection of physical server devices (e.g., server nodes, gaming consoles) organized in a hierarchical structure including clusters, computing zones, virtual local area network (VLANs), racks, fault domains, etc. In one or more embodiments, the server devices may be implemented within a datacenter (e.g., a regional datacenter) including any number of server devices connected via an internal network of the datacenter and which provides any number of cloud computing services to clients of the cloud computing system. In one or more embodiments described herein, the cloud computing system includes gaming consoles and other server nodes that cooperatively perform features and functionalities described herein in connection with detecting instances of events within a gaming session and generate event reports to be provided to gaming services and/or client systems.

As used herein, a "client system" refers to one or more devices over which digital content (e.g., gaming content) is provided to a user. For example, a client system may include a local streaming device, a display device, one or more controllers for providing input commands, and any other device configured to provide content to a user. In one or more embodiments, a client system refers to a combination of multiple devices (e.g., a local gaming console, a television, and a gaming controller). In one or more implementations, a client system refers to a single or integrated computing device, such as a laptop computer or a mobile device.

As used herein, "gaming content" refers to any content associated with how a user may experience a gaming session. For example, in one or more embodiments described herein, gaming content refers to video content that is displayed via a display device having a display screen and/or graphical user interface displayed thereon. In addition, gaming content may refer to audio content that is presented via a speaker or other audio display device. In one or more embodiments, gaming content may refer to tactile feedback and/or visual feedback provided via a non-display device, such as a vibration or rumble of a gaming controller or a light that can turn on and/or change colors (e.g., keyboard lights, controller lights). In one or more embodiments, gaming content refers to user inputs or user commands that can affect the gaming content presented via a display device. Indeed, gaming content may refer to any gaming content and associated data that is delivered or otherwise presented via a device of a client system and experienced or otherwise consumed by a user.

As used herein, a "gaming session" refers to an instance of a gaming application that is running on one or more devices. For example, a gaming session may refer to some period of time associated with starting up or initiating engagement with a gaming application or gaming service and logging off or otherwise disengaging from the gaming application or service. To illustrate, a gaming session may include an instance in which a user initiates a video game, plays the video game for some period of time, and either logs off, closes the application, or simply disengaged from the video game for some period of time (e.g., a threshold period of inactivity). In another implementation, a gaming session may include an instance in which a user logs onto a gaming service or platform, plays one or multiple video games that are hosted or otherwise accessible via the gaming service or platform, and either logs off, closes the service, or simply disengaged from the gaming service for some period of time.

As used herein, a "recognizer" or "event recognizer" may refer to a component of the event reporting system having one or more models (e.g., machine learning models) that are trained to detect objects, content, or any detectable event within gaming content that is provided to a client system. For example, a recognizer may include one or more models that have been trained to detect various objects, combinations of objects, series of inputs, or combination of any number of signals that are indicative of an instance of an event that occurs within a gaming session. By way of example and not limitation, where a character in a gaming session jumps, a recognizer may be trained to detect a series of movements or objects that are indicative of a character jumping and generate an output indicating an instance of a jump and associated information within a gaming session. Other examples and use-cases will be discussed in connection with one or more embodiments described herein.

As used herein, an "event" or "in-game event" refers to a series of signals that are associated with a defined in-game event. For example, and as will be discussed in further detail below, an in-game event may refer to a series of signals associated with a particular happening or occurrence within a gaming session. As indicated above, an in-game event may refer to a character jumping within a gaming session. Other in-game events may include occurrences such as a character dying, starting a new level, finishing a level, pausing the game, pausing the game more than a threshold period of time, unpausing the game, winning a race, losing a race, finishing a race, finishing a race within a predetermined amount of time. Other in-game events may refer to unexpected or undesirable in-game occurrences such as in-game defects, in-game exploits, in-game artifacts (e.g., unintended flaws in the video or graphics), or other detectable occurrence that detract from a gaming experience.

Indeed, in-game events may be defined to include any number of occurrences (or even multiple defined events) as defined by a user, administrator, a developer, or other entity. In-game events may refer to combinations of one or more signals based on outputs of various models that make up one or more recognizers. While an event may be specific to a particular gaming application, in one or more embodiments described herein, an event may include instances of the event that occur across different gaming applications, different generations of similar gaming applications (e.g., different versions or editions of a common gaming title), and even across gaming applications associated with completely different genres and publishers.

Additional detail will now be provided regarding systems for detecting in-game events and generating an event report including information about the detected events. For example, FIG. 1 illustrates an example environment 100 within which an event reporting system 108 is implemented in accordance with one or more embodiments. As shown in FIG. 1, the environment 100 includes server device(s) 102, which may include any number of server nodes of a cloud computing system. As further shown, the environment 100 may include one or more third-party server device(s) 104 and a client system 106 (e.g., a client gaming system).

As shown in FIG. 1, the server device(s) 102 may include an event reporting system 108 implemented thereon, which may include a gaming service 110, an event recognizer system 112, and an event analysis system 114. Each of these components 110-114 and associated features and functionality may be implemented across multiple server devices of a cloud computing system. Alternatively, features and functionality discussed in connection with respective components 110-114 of the event reporting system 108 may be performed on the same server devices. As further shown in FIG. 1, the event recognizer system 112 may include a recognizer training system 116 (or simply a "training system"), event recognizers 118, and detection models 120. Moreover, the event analysis system 114 may include an event report manager 122 and a data storage 124 having event data 126 stored or otherwise maintained thereon. Each of these components will be discussed in further detail below.

As mentioned above, the environment 100 may include one or more third-party server device(s) 104 having one or more publisher system(s) 128 implemented thereon. The publisher system(s) 128 may include provider or publisher-specific services hosted by various publishers associated with one or more gaming applications. In one or more embodiments, the publisher system(s) 128 may maintain original copies of gaming applications as well as user information associated with user(s) of the client system 106. While FIG. 1 illustrates an example implementation in which a publisher system 128 is hosted on one or more third-party servers 104, it will be appreciated that one or more features of the publisher system(s) 128 may be implemented on the gaming service 110 or other component(s) 112-114 of the event reporting system 108 and on the same cloud computing system as the illustrated server device(s) 102. For example, where the same entity that provides the gaming service 110 also provides specific gaming content, or where a third-party publisher provides full access to a gaming application to be hosted by the gaming service 110, features of the publisher system(s) 128 may be implemented on the event reporting system 108.

As shown in FIG. 1, the client system 106 may include one or more display device(s) 130 and one or more input device(s) 132. For example, as mentioned above, a client system 106 may include a local computing device (e.g., a gaming console) coupled to various hardware for providing gaming content of a gaming session to a user of the client system 106. In one or more embodiments, this may include separate display device(s) 130 and input device(s) 132 (e.g., a desktop computer and keyboard/mouse, a television and gaming controller coupled to a local console). In one or more embodiments, the display device(s) 130 and input device(s) 132 are part of a single or otherwise integrated computing system (e.g., a laptop computer, a mobile device).

Indeed, it will be appreciated that the client system 106 may refer to various types of computing devices coupled to or otherwise including a display device 130 and/or an input device 132. For example, the client system 106 may include a mobile device, such as a mobile telephone, a smart phone, a personal digital assistant (PDA), a tablet, or a laptop. Additionally, or alternatively, the client system 106 may include one or more non-mobile devices such as a desktop computer, server device, or other non-portable device. In one or more implementations, the client system 106 refers to dedicated gaming devices (e.g., handheld gaming devices) or a video game console in communication with a display device. In one or more implementations, the client system 106 may include graphical user interfaces integrated thereon (e.g., a screen of a mobile device). In addition, or as an alternative, the client system 106 may be communicatively coupled (e.g., wired or wirelessly) to a display device having a graphical user interface thereon for providing a display of visual gaming content. It will also be appreciated that the server device(s) 102 and third-party server device(s) 104 may refer to a variety of computing device. Each of the devices and systems 102-106 of the environment 100 may include features and functionality described below in connection with FIG. 9.

As shown in FIG. 1, the server device(s) 102, third-party server device(s) 104 and client system 106 can communicate with each other directly or indirectly through a network 134. The network 134 may include one or multiple networks and may use one or more communication platforms or technologies suitable for transmitting data. The network 134 may refer to any data link that enables transport of electronic data between devices and/or modules of the environment 100. The network 134 may refer to a hardwired network, a wireless network, or a combination of a hardwired and a wireless network. In one or more embodiments, the network 134 includes the Internet.

As will be discussed in further detail below, the gaming service 110 may provide one or more services associated with hosting and delivering gaming content to the client system 106. For example, in one or more embodiments, the gaming service 110 refers to a cloud-based gaming service in which one or more physical gaming consoles on a cloud computing system can host gaming sessions and deliver gaming content to the client system 106. In this example, the gaming consoles may run or host a gaming session and process inputs received from the client system 106 (e.g., from the input device(s) 132). In one or more embodiments, the gaming service 110 can stream or otherwise deliver the gaming content to the client system 106 over the network 134.

In addition to delivering gaming content to the client system 106, the gaming service 110 may provide a copy or feed of the gaming content to the event recognizer system 112. The gaming service 110 may also provide indications of input commands received in connection with the gaming content. As will be discussed in further detail below, the event recognizer system 112 may apply one or more event recognizers 118 to the gaming content to identify instances of one or more events that occur within a gaming session. As shown in FIG. 1, the event recognizers 118 may make use of any number of detection models 120 having been trained (e.g., by the recognizer training system 116) to detect various signals indicative of one or more events that occur within a gaming session.

Upon identifying one or more instances of an event, the event recognizer system 112 can provide event information to an event analysis system 114 for further processing and generating an event report based on tracked instances of various events. For example, as mentioned above, the event analysis system 114 may include an event report manager 122 configured to generate event reports including information associated with any number of detected instances of one or multiple events.

For example, as will be discussed in further detail below, the event report manager 122 may receive notifications of events from the event recognizer system 112 indicating any information associated with the detected instances. For example, the event report manager 122 may receive timing information (e.g., timestamps) of the detected events. The event report manager 122 may additionally receive any number of detected signals by the various models to associated with the tracked instances of the events. In one or more embodiments, the event report manager 122 may receive portions of the gaming content itself, such as control inputs, to associate with or otherwise maintain in combination with a record of tracked instances.

The event report manager 122 maintain information for the events in a variety of ways. In one or more embodiments, the event report manager 122 maintains a record of instances for each event corresponding to an event recognizer. In one or more embodiments, the event report manager 122 may maintain records of instances for each event detected with respect to a corresponding user of the gaming service 110. For example, instances for multiple event-types may be maintained together for an individual user. In one or more embodiments, the event report manager 122 simply maintains a database including each instance and associated metadata indicating a user identifier, an event identifier, timing information, and any other information associated with the tracked event. As will be discussed in further detail below, the event report manager 122 may utilize the tracked instances of the events and associated information in a variety of ways for generating various types of event reports that may be used in a variety of use-case scenarios.

As shown in FIG. 1, the event analysis system 114 may include a data storage 124 having event data 126 stored or otherwise maintained thereon. The event data 126 may include any information associated with any of the tracked instances of events. For example, the event data 126 may include indications of tracked instances and unique identifiers associated therewith. The event data 126 may include timestamp data, an identification of a particular recognizer (or multiple recognizers) used to track the associated instance, a user identifier indicating a user or specific client system associated with the tracked instance, a gaming session identifier, a gaming application identifier, and any other information that may be useful in analyzing the instance of the event (and other instances of the event). In one or more embodiments, the event data 126 further includes some portion of the content data itself, such as (by way of example) controller inputs or audio content associated with the video content that was used in detecting the event instance. As noted above, the event data 126 may be maintained in a single record including event instance identifiers and associated data. In one or more embodiments, the event data 126 may include data that is grouped by user, gaming application, gaming platform, or by event-type. Additional detail in connection with various types of event data and event reports that may be generated based on the tracked event data will be discussed in connection with various examples below.

Figure 2:
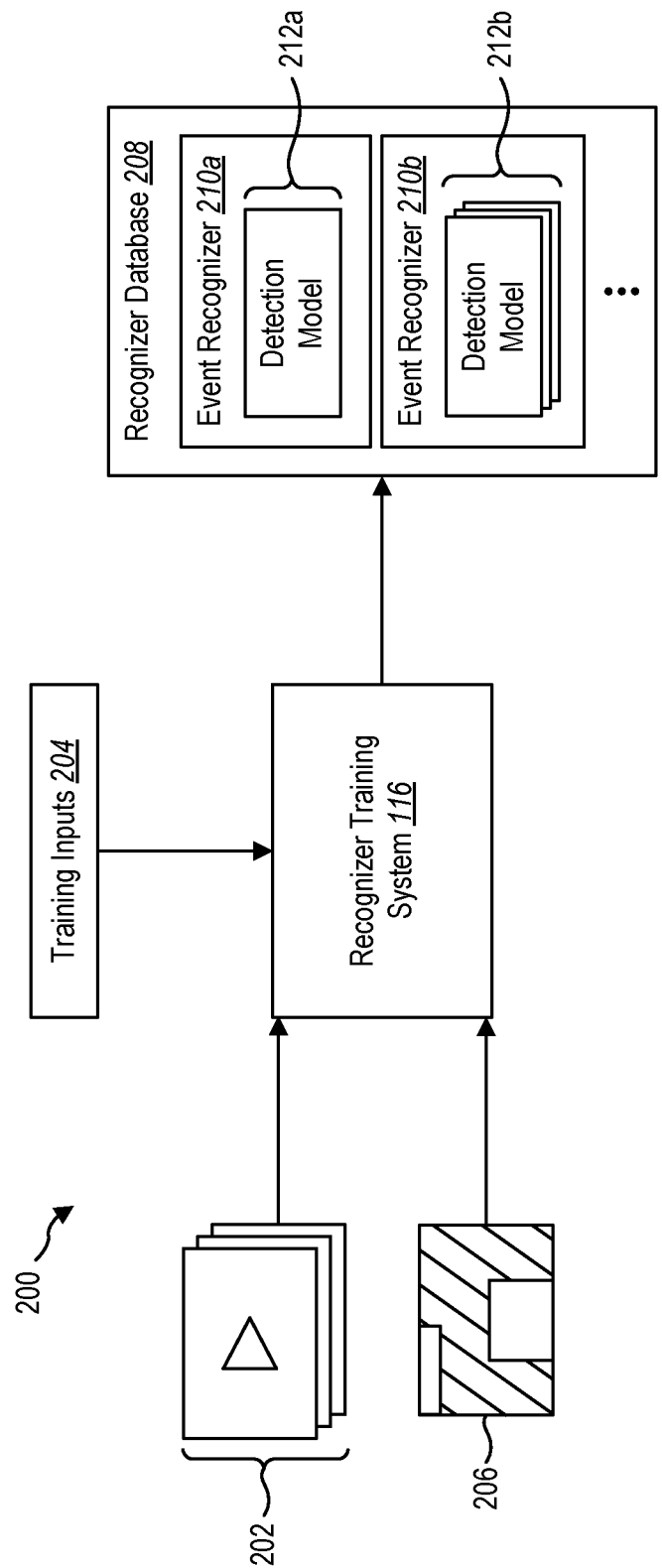
FIG. 2 illustrates an example implementation of the event reporting system in which event recognizers are trained to detect in-game events in accordance with one or more embodiments.

Additional information will now be discussed in connection with training event recognizers. For example, FIG. 2 illustrates an example implementation of a portion of the event reporting system 108 in which event recognizers can be trained to detect various events in in accordance with one or more embodiments. In particular, FIG. 2 illustrates an example workflow 200 in which an example implementation of the recognizer training system 116 can train one or more recognizers to detect various events based on gaming content associated with a given gaming session.

As will be discussed below, the recognizer training system 116 may be trained based on a variety of training data. In particular, in the workflow 200 shown in FIG. 2, the recognizer training system 116 may receive a collection of video frames 202 including digital images of video content for one or more gaming sessions. In one or more embodiments, the video frames 202 refer to previously recorded and saved video content associated with one or more gaming sessions within which various events have occurred.

In one or more embodiments, the recognizer training system 116 receives additional gaming content and training data associated with the video frames 202. For example, in one or more embodiments, the recognizer training system 116 receives audio content that was presented in conjunction with the video frames 202. In one or more implementations, the recognizer training system 116 further receives input data including an indication of any input commands that were received in conjunction with the corresponding video frames 202 and associated audio data. For example, the video frames may be associated with corresponding timestamps that may be used to associate the video frames 202 with corresponding audio content, input commands, and any other gaming content associated with a corresponding gaming session.

In addition to the video frames 202 and any additional gaming content, the recognizer training system 116 may further receive training inputs 204 associated with the corresponding video frames 202. In particular, the recognizer training system 116 may receive training inputs 204 indicating ground truths associated with one or more events that are determined to occur within the corresponding gaming content. In one or more embodiments, the training inputs 204 may refer to human inputs or other supervised training inputs that provide ground truth or highly accurate predictions of truth data corresponding to a specific event or type of event that occurred within the video frames 202.

By way of example, if the recognizer training system 116 is being used to train or otherwise generate an event recognizer to recognize a pause event associated with a game being paused, the recognizer training system 116 may receive training inputs 204 indicating whether the game is paused for a given video frame. In one or more embodiments, this may be based on tags provided by users based on observations of the users with respect to the video frames 202 and other gaming content. As a simple example, where a video frame includes a display of a pause menu or other visible icon indicating that a gaming session is paused, a corresponding training input 204 would indicate that the game is paused for a given video frame. Conversely, where a video frame does not include a display of a pause menu or other pause-indicating icon, a corresponding training input 204 would indicate that the game is not paused for the corresponding video frame(s).

The recognizer training system 116 may utilize these input video frames 202 and associated training inputs 204 to train an event detection model to imitate the training inputs and predict whether a gaming session is paused based on correlations between the training inputs 204 and various features or characteristics of the tagged video frames 202. In this way, one or more pause detection models may be trained to recognize when a game is paused based on a display of a pause icon or any combination of observed signals (e.g., pause music, lack of movement, a received pause input) that would enable the model and associated event recognizer to accurately predict when a gaming session is paused.

The detection models (e.g., detection models 212a-b) may refer to a variety of models and algorithms that may be used to predict various signals and ultimately determine whether an instance of an event corresponding to the signal(s) has occurred within a gaming session. In one or more embodiments, the detection models may refer to machine learning models or other deep learning models. As used herein, a "machine learning model" may refer to one or more computer algorithms or models (e.g., a classification model, a regression model) that can be tuned (e.g., trained) based on training input to approximate unknown functions. For example, a machine learning model may refer to a neural network (e.g., a convolutional neural network, a recurrent neural network) or other architecture that learns and approximates complex functions and generates outputs based on one or more inputs provided to the machine learning model. As will be discussed in connection with various examples herein, different machine learning models may generate various output signals that may be combined or otherwise considered by a recognizer to determine whether an event has occurred for a corresponding portion of gaming content (e.g., within a particular video frame or series of video frames).

In training the various models and recognizers, in one or more implementations, the recognizer training system 116 may receive area of interest information 206 associated with locations within the gaming content that various events are likely to occur. As shown in FIG. 2, the recognizer training system 116 may receive area of interest information 206 including a segmentation mask that indicates areas of the video frames 202 that should be considered in determining whether an instance of an event occurs within a corresponding video frame. In this way, the recognizer training system 116 may discount or simply not consider other portions of the video frames in training models to detect various signals and events. This limitation of training to areas of interest of the video frames 202 can enable the recognizer training system 116 to efficiently train the various machine learning models in less time and using less training data.

In addition to more efficiently training the various event detection models and recognizers, providing area of interest information 206 may provide useful information for training models associated with detecting events of similar types between different gaming applications or on different gaming platforms (e.g., different devices). As an example, where an event refers to an occurrence in which an avatar's health bar falls below some threshold level or percentage, the area of interest may indicate a first portion (e.g., a specific region) of video frames within which the health bar would appear for a first gaming application. Similarly, the area of interest may indicate a second portion of video frames (e.g., a different region within the video frames) within which the health bar would appear for a second gaming application (or on a different device). While this may involve training two different models (or variations of the same models) for the respective gaming applications to detect similar events, the models may nonetheless be trained using relatively fewer video frames and associated training inputs than where entire portions of video frames would be considered in training the corresponding event detection models.

Upon training the various models, the recognizer training system 116 may provide the event recognizers and associated detection models to a recognizer database 208. As shown in FIG. 2, the recognizer database 208 may include a plurality of event recognizers and associated detection models. For example, the recognizer database 208 may include a first event recognizer 210a having an associated detection model 212a. As further shown, the recognizer database 208 may include a second event recognizer 210b and an associated set of detection models 212b.

As shown in FIG. 2, various event recognizers may include one or multiple models based on a number of considerations and specifics of the unique events that the recognizers are trained to detect. For example, in one or more embodiments, recognizing a simple event such as appearance of a black screen may involve a single model trained to detect occurrence of a threshold number of black video frames. Alternatively, recognizing a more complex event, such as an event titled "barely passing a level" may involve a first model trained to detect that a health bar is below a threshold level in addition to a second one or more models trained to detect that a level has been passed. In one or more embodiments, functionality of these models may be combined for a particular event recognizer to detect a corresponding in-game event (e.g., passing a level having less than a threshold amount of avatar health).

In addition to the event recognizers having one or multiple models, in one or more embodiments, one or more models may be utilized by different recognizers. For example, in one or more embodiments, when tasked with training an event recognizer, the recognizer training system 116 may identify a previously trained model or commonly used model that relates to a number of different events and incorporate functionality of the model within the event recognizer. In this way, as the recognizer database 208 becomes more robust over time with more recognizers being trained to detect instances of a wider variety of in-game events, the recognizer training system 116 may leverage functionality of previously trained models or simply fine-tune existing models to fit within a defined functionality of one or multiple event recognizers.

Figure 3:
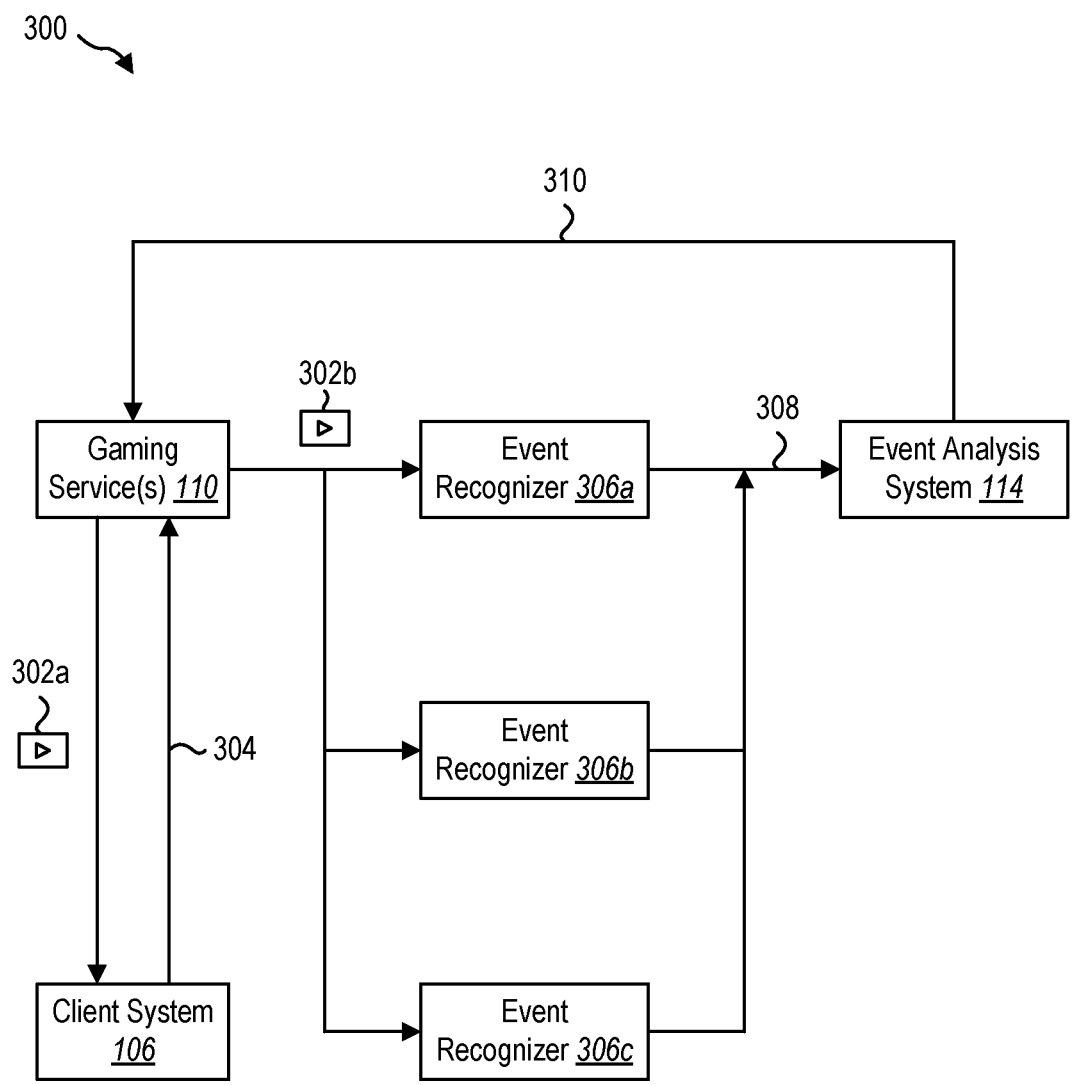
FIG. 3 illustrates an example implementation of the event reporting system in which event recognizers are implemented to detect various in-game events for use in generating event reports and without interrupting a gaming experience.

FIG. 3 illustrates an example implementation of the event reporting system 108 in which previously trained event recognizers are used to detect various in-game events. For example, FIG. 3 illustrates an example workflow 300 showing a flow of data and gaming content between the gaming service 110, event recognizer system 112, and the event analysis system 114 on a cloud computing system. In particular, as mentioned above, and as will be discussed in further detail below, the components 110-114 of the event reporting system 108 may cooperatively identify instances of a variety of in-game events that occur within a gaming session and provide an event report including information associated with the identified instances of in-game events.

As shown in FIG. 3, the gaming service 110 can provide first gaming content 302a to a client system 106. In one or more embodiments, the first gaming content 302a refers to an original feed of gaming content being streamed or otherwise delivered to a client system 106. In one or more embodiments, the gaming service 110 includes a cloud-based gaming console that generates and processes gaming content (e.g., multi-media content) and delivers the first gaming content 302a to be displayed on a display device of the client system 106.

As shown in FIG. 3, the client system 106 may provide input commands 304 associated with the first gaming content 302a. In particular, where the client system 106 includes one or more controller devices (e.g., a keyboard, mouse, gaming controller, touch screen interface) capable of detecting user inputs, the client system 106 may provide input commands 304 including the various inputs as they are received at an input device(s) of the client system 106. In one or more embodiments, the gaming service 110 processes the input commands, implements the commands within the gaming session, and continues to provide the first gaming content 302a based on the input commands. While this processing is performed on the gaming service 110 (e.g., cloud-based gaming console); from a user's perspective, the delivery and processing of the input commands may be very similar to conventional systems in which a local gaming console hosts and provides gaming content and processing local input commands.

At a same time or at some point after delivering the first gaming content 302a to the client system 106, a second gaming content 302b (e.g., a copy of the original gaming content) can be provided to event recognizers of an event recognizer system 112. In the example shown in FIG. 3, the copy of the gaming content 302b is provided to each of a plurality of event recognizers 306a-c that have been respective trained to detect in-game events. For example, a first event recognizer 306a may include one or more machine learning models trained to detect instances of a first type of event, a second event recognizer 306b may include one or more machine learning models trained to detect instances of a second type of event, and a third event recognizer 306c may include one or more machine learning models trained to detect instances of a third type of event.

While FIG. 3 shows an example including three event recognizers 306a-c individually trained to detect different types of events, other implementations may include fewer or additional event recognizers trained to detect any number of events. For example, in one or more embodiments, a copy of the gaming content 302b may be provided to each of multiple event recognizers simultaneously to be processed in parallel.

As mentioned above, the copy of the gaming content 302b may be provided to the event recognizers 306b at the same time as the original gaming content 302a is delivered to the client system 106. Alternatively, in one or more embodiments, the copy of the gaming content 302b is provided to the event recognizers after the fact for purposes of telemetry tracking and, in some cases, additional training of the event recognizers 306a-c.

In addition, in one or more embodiments, one or more event recognizers may be used to detect events in real-time as the original gaming content is delivered to the client system 106 while one or more additional event recognizers may be used to detect events after the fact for other reporting purposes. For example, in one or more embodiments, an event recognizer may detect an event based on a history of events observed over a prolonged period of time. Accordingly, tracking and maintaining a current count of event instances may not be as crucial for a particular event-type and rather than using computing resources at a period of peak demand for a cloud computing system, the event recognizer(s) may be more efficiently utilized during periods of non-peak computing demand on the cloud computing system. In this and other examples, the event recognizer system 112 may run one or more event recognizers as part of a batch processing job.

Another example in which real-time recognition may be less necessary is in the context of watching replays of gaming sessions. Indeed, as watching replays of gaming sessions has increased in popularity, one or more event recognizers may be applied to video and other gaming content after the fact (i.e., after a time at which original gaming content is delivered in real-time to the client system 106) and various in-game events may be identified for purposes of generating a comprehensive report of the replayed gaming session.

In either implementation related to analyzing the copy of the gaming content 302b delayed or in real-time, the recognizer training system 116 may generate output signals 308 from the event recognizers 306a-c indicating whether one or more instances of events are detected for a corresponding portion of the gaming content (e.g., a video frame or range of multiple video frames). As shown in FIG. 3, the output signals 308 may be provided to an event analysis system 114 for further processing.

In particular, as mentioned above, in one or more embodiments, the event analysis system 114 can receive the indicated instances of events at corresponding portions or timestamps of the gaming content. As will be discussed in further detail below, the event analysis system 114 can generate event reports based on the detected instances of the events.

For example, in addition to receiving output signals 308 indicating instances of events, the event analysis system 114 may receive information associated with the gaming applications and/or hardware on which the original gaming content 302a is presented. In one or more embodiments, the output signals 308 include JavaScript Object Notation (JSON) objects including an indication of a corresponding event and a gamer tag or user identifier that may be used to identify a particular gaming session and specifications of a client system 106. As noted above, the event analysis system 114 may maintain a record of event instances and associated information for further processing and for generating event reports.

As noted above, the event analysis system 114 may utilize the tracked event instances and associated information in a variety of ways to generate event reports in accordance with one or more embodiments. As a first example, the event analysis system 114 may generate an event report that includes a compilation of information associated with a user or user account based on events that have been detected for gaming sessions associated with the user. For example, as noted above, the event recognizers may output a JSON object including an indication of a gamer tag or other user identifier associated with the detected instances of the events. In one or more embodiments, the event analysis system 114 may compile any number or all detected events associated with the user identifier to generate a comprehensive report for the user.

In this example, the event analysis system 114 may generate an event report that reflects a record of gaming sessions or a "gaming career" for the user including a variety of information and statistics based on the detected event instances. For example, the event analysis system 114 may generate a career report including tracked number of levels passed, statistics associated with passing the levels, timing statistics associated with duration of gameplay, win and loss statistics, and any additional information that may be derived from the tracked instances of events. Indeed, with the event recognizers being trainable to detect nearly limitless varieties of events, the gaming career may include event reports ranging from simple listings of statistics to very comprehensive statistics for an individual user.

In addition to individual reports, the event analysis system 114 may additionally generate reports that includes tracked events with respect to multiple users. For example, the event analysis system 114 may track event instances and associate co-occurrence of the various instances for a user with other users of a gaming service 110. Using this information, the event analysis system 114 may generate event reports including statistics of a user with respect to another user (e.g., head-to-head statistics, co-operation statistics) or how the user performs on various teams of co-users. For example, the event reports may detect instances of events that occur with respect to gaming sessions for gaming applications played by both the user and various co-users of the cloud computing system. As used herein, co-users of the cloud computing system may refer to friends of a user, teammates of a user, public users, or any other users of a cloud computing system for which the event analysis system 114 has a history of gaming sessions and detected event instances stored thereon. In these examples, the event analysis system 114 may utilize output signals 308 received for the same or different event recognizers that have been applied to gaming sessions for multiple users. The event analysis system 114 may further generate event reports including information based on instances of events that have been detected for both the user and other users that interact within respective gaming sessions.

As noted above, the event recognizers may be applied to gaming content originating from different gaming applications. For instance, in the example above in which an event report is generated for a specific user, the event report may include any information associated with event instances that are detected across different gaming applications, even where the event instances are detected using a common event recognizer. For example, where an event recognizer is trained to detect "wins" for any of a number of gaming applications, the event analysis system 114 may generate an event report that includes a win statistics based on win instances that were detected by the same event recognizer across multiple gaming applications.

Using similar principles, the event analysis system 114 may generate event reports that include information for corresponding events that have been detected across different gaming platforms. For example, as noted above, because the event recognizer(s) may be trained to detect instances of events based on video content (and/or other gaming content), the event recognizer(s) may detect instances of similar or identical events on different hardware devices (e.g., mobile device, desktop computer) using the same or related trained event detection models.

As another example, and as will be discussed in further detail below, the event analysis system 114 can generate an event report based on unexpected or undesired occurrences. For example, in one or more embodiments, a system administrator or publisher may receive an identification of a certain exploit that is happening in a gaming application that is negatively effective the gaming experience of various users. In this example, an event recognizer may be trained to detect instances of the exploit based on some combination of detectable signals to determine a frequency with which the event is occurring.

In this implementation, the event analysis system 114 may receive output signals 308 indicating instances of this event (or lack of instances of the event) to determine a frequency with which the unexpected occurrence is happening within gaming sessions. The event analysis system 114 may further determine whether the exploit or other unexpected occurrence is happening for specific individuals to determine whether exploits are happening on purpose or as a result of a flaw of a gaming application. Indeed, the event analysis system 114 may be used in this way to diagnose any number of causes associated with unexpected in-game occurrences to enable a publisher or gaming content provider to know if there is an easy fix or whether redevelopment needs to be performed to correct a specific type of in-game event.

As shown in FIG. 3, upon generating the event report, the event analysis system 114 may provide a copy of the event report 310 to the gaming service(s) 110. The copy of the event report 310 may be used in a variety of ways. In one or more embodiments, the gaming service(s) 110 may perform additional processing to improve a gaming experience. In one or more embodiments, the copy of the event report 310 may be provided to a publisher system 128 for use in redeveloping one or more gaming application. In one or more embodiments, the copy of the event report 310 is provided to a client system 106 for use by an individual user in any of a variety of ways.

As mentioned above, the event reporting system 108 may be used to detect unexpected occurrences and generate event reports is discussed in connection with FIG. 4. In particular, FIG. 4 illustrates an example workflow 400 showing one implementation in which the event reporting system 108 may be used to detect instances of one or more artifacts (e.g., losses of gaming content) that may occur within a display of gaming content on a client system. In particular, FIG. 4 illustrates a workflow 400 in which one or more event recognizer(s) 402 may be trained to detect instances of an artifact and implemented to detect instances that may be used in generating an event report for the artifact.

As shown in FIG. 4, the gaming service 110 may receive a notification that an artifact is has occurred or is occurring on a client system 106. For example, as shown in FIG. 4, the gaming service 110 may receive a tagged video frame 404 and an identified area of interest 406 indicating a portion of the video frame 404 within which an artifact has been identified. In one or more embodiments, the gaming service 110 receives multiple notifications from different users.

The reported occurrences of the artifact may initiate training of an event recognizer 402. For example, in one or more embodiments, an event recognizer system 112 may initiate training of the event recognizer(s) 402 based on the received report. In one or more embodiments, the event recognizer system 112 initiates training the event recognizer(s) 402 based on receiving a threshold number of reports from a number of users of the gaming service 110. In one or more embodiments, the event recognizer system 112 may initiate training the event recognizer(s) 402 based on a request from a publisher or other entity after having received a notification that an artifact or other unexpected occurrence is appearing within gaming content from one or more gaming sessions.

After training the event recognizer(s) 402, the event recognizer system 112 may apply the event recognizer(s) 402 to video frames 408 for corresponding gaming sessions. In accordance with one or more embodiments described herein, because the event recognizer(s) 402 may be trained based on an indicated area of interest 406, the event recognizer(s) 402 may be applied to selective portions of the video frames 408 corresponding to the area of interest 406 within which the artifact was originally reported. In this way, the event recognizer(s) 402 may be selectively applied to portions of the video frames 408 to specifically identify instances of an artifact. This may prevent unnecessary analysis of non-relevant portions of video frames. In addition, this may prevent a number of false predictions in which the event recognizer(s) 402 incorrectly detects an instance of the artifact or incorrectly fails to detect valid instances.

As shown in FIG. 4, the event recognizer 402 may generate and provide outputs 410 indicating instances of the artifact (or other detected event(s)) to the event analysis system 114 for further processing. In particular, in one or more embodiments, the event analysis system 114 may generate an event report 412 based on the outputs 410 received from the event recognizer 402. The event report 412 may include statistics associated with occurrence of the artifact. The event report 412 may additionally include information about gaming sessions and/or gaming content associated with the respective instances.

The event report 412 may be utilized in a number of ways. In one or more embodiments, the event report 412 may provide simple statistics associated with occurrence of the artifact within the video frames 408. For example, the event report 412 may indicate a percentage of time that the artifact occurs under a particular set of circumstances. This information may be used to determine whether the artifact is occurring for a specific gaming application or on a particular system or from a particular gaming server. This information may additionally be used to determine to what extend the artifact is occurring within gaming sessions.

In one or more embodiments, the information from the event report 412 may be used to determine an appropriate action to perform in response to detected instances of the artifact. For example, where the artifact is occurring at a large frequency within gaming sessions, the event analysis system 114 (or another component, such as the publisher system 128) may determine that redevelopment to a gaming application is needed in the form of a software patch or other development effort. Alternatively, where the event report 412 indicates that the artifact occurs in a small number of cases, remediation of the artifact may be scheduled as part of a routine system update and/or fixed by way of a graphical enhancement that the gaming server may be configured to add to gaming sessions for a gaming application.

Figure 5A:
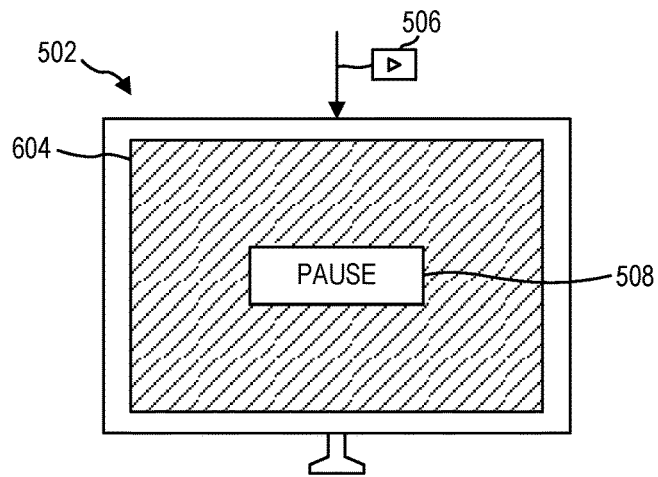
FIGS. 5A-5C illustrate example implementations in which an event reporting system is configured to detect instances of an event across multiple applications and platforms in accordance with one or more embodiments.
Figure 5B:
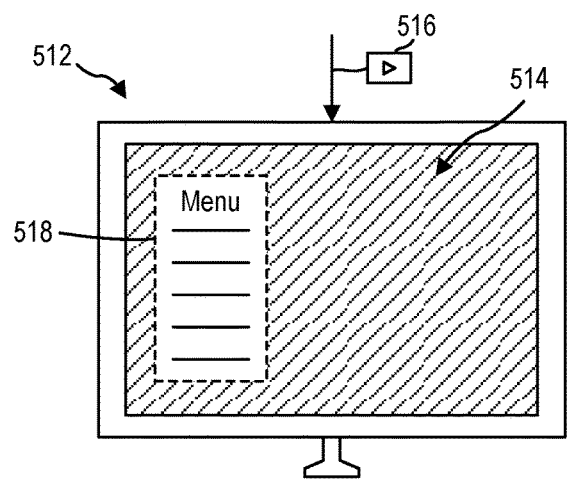
Figure 5C:
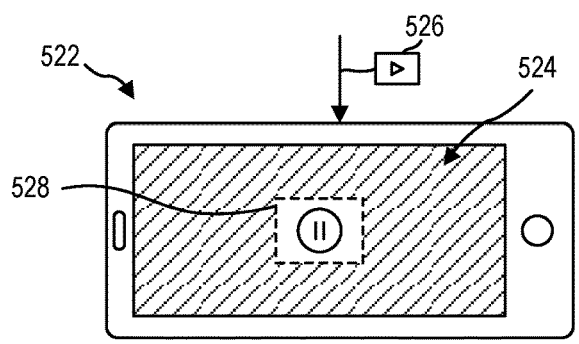

As noted above, the event reporting system 108 may be used to detect and track instances of a wide variety of in-game events based on gaming content presented via a number of devices and across multiple gaming applications. FIGS. 5A-5C illustrate example implementations of computing devices and associated graphical user interfaces that illustrate one or more features that may be implemented in connection with detecting instances of an example in-game event. For example, as will be discussed below, FIGS. 5A-5C illustrate example implementations showing three variations of gaming applications and devices across which a "pause" event may be detected using an event recognizer in accordance with one or more embodiments described above.

In particular, FIG. 5A illustrates a computing device 502 having a graphical user interface 504. The computing device 502 may refer to an example client system 106 as discussed in connection with one or more embodiments above. As shown in FIG. 5A, gaming content 506 may be provided to the computing device 502 including video content to be displayed via the graphical user interface 504 of the computing device 502. In this example, the event reporting system 108 may include an event recognizer trained to detect an instance in which a gaming application is paused.

In the example shown in FIG. 5A, the event reporting system 108 may include an event recognizer trained to evaluate a first area of interest 508 based on a gaming application (e.g., a first gaming application) being configured to display "PAUSE" text within the first area of interest 508. Accordingly, in this example, the event recognizer may include an event detection model (e.g., a first model) trained to selectively evaluate video frames of a copy of the gaming content 506 to detect a display of text that spells "PAUSE" within the first area of interest 508.

FIG. 5B illustrates another computing device 512 having a graphical user interface 514. The computing device 512 may refer to an example client system 106 as discussed in connection with one or more embodiments above. As shown in FIG. 5B, gaming content 516 may be provided to the computing device 512 including video content to be displayed via the graphical user interface 514 of the computing device 512. In this example, the event reporting system 108 may include the event recognizer trained and implemented to detect instances in which a gaming application is paused. In this example, the gaming application may refer to a different gaming application than the gaming application discussed in connection with FIG. 5A.

In the example shown in FIG. 5B, the event reporting system 108 may include the event recognizer that is trained to evaluate a second area of interest 518 based on a gaming application (e.g., a second gaming application) being configured to display a menu within the second area of interest 518. Accordingly, in this example, the event recognizer may include an event detection model (e.g., a second model) trained to selectively evaluate video frames of a copy of the gaming content 516 to detect a display of a menu within the second area of interest 518.

In each of the examples illustrated in FIGS. 5A-5B, it will be understood that the event recognizer may include one or multiple event detection models trained to evaluate gaming content differently depending on the gaming application that is running on a gaming service 110 or based on characteristics of the computing devices themselves. For example, where FIG. 5A shows gaming content 506 for a first gaming application, the event recognizer may include a first model trained specifically based on video frames that were generated in connection with the first gaming application. Similarly, where FIG. 5B shows gaming content 516 for a second gaming application, the event recognizer may include a second model trained specifically based on video frames generated in connection with the second gaming application. Accordingly, in one or more embodiments, upon receiving gaming content from a computing device, the event recognizer may apply a subset of one or more models from a set of models that make up the event recognizer to detect instances of the various in-game events.

In addition to detecting in-game events across different gaming applications, the event reporting system 108 may detect instances of similar events across different gaming platforms and devices. For example, FIG. 5C illustrates another computing device 522 (e.g., a mobile computing device) having a graphical user interface 524. The computing device 522 may refer to an example client system 106 as discussed in connection with one or more embodiments above. As shown in FIG. 5C, gaming content 526 may be provided to the computing device 522 including video content to be displayed via the graphical user interface 524 of the computing device 522. In this example, the event reporting system 108 may include the event recognizer trained an implemented to detect instances in which a gaming application is paused.

In the example shown in FIG. 5C, the event reporting system 108 may include the event recognizer that is trained to evaluate a third area of interest 528. In particular, the event recognizer may be trained to evaluate the third area of interest 528 based on information associating the gaming content 526 with the particular computing device 522 and/or based on the particular gaming application running on a gaming service 110 and providing the gaming content 526 to the computing device 522. Accordingly, in this example, the event recognizer may include an event detection model trained to selectively evaluate video frames of a copy of the gaming content 526 to detect a display of a pause icon (e.g., the pause symbol) within the third area of interest 528.

Figure 6A:
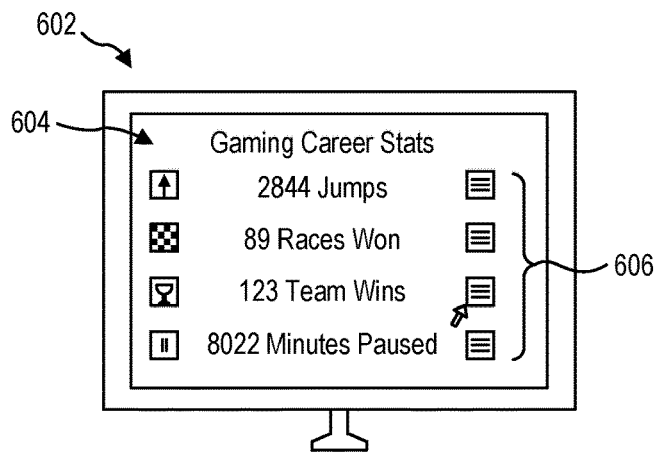
FIGS. 6A-6C illustrate various features of an interactive event report generated by an event reporting system in accordance with one or more embodiments.
Figure 6B:
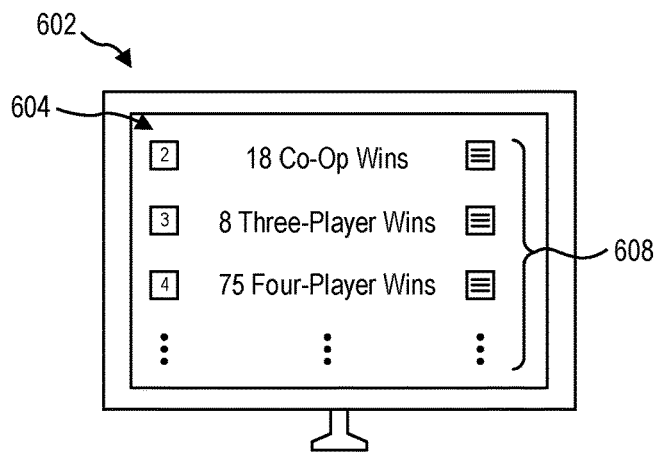
Figure 6C:
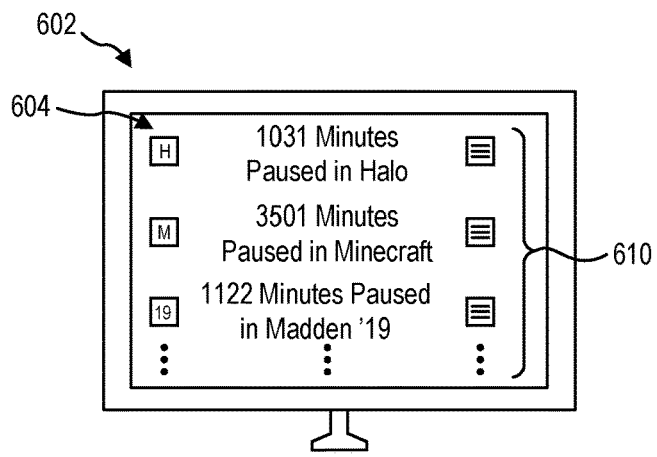

FIGS. 6A-6C illustrate example graphical user interfaces of a computing device showing example implementations of event reports that may be displayed in accordance with one or more embodiments. For example, FIG. 6A illustrates a computing device 602 having a graphical user interface 604. As shown in FIG. 6A, an event report including a listing of tracked events 606 may be displayed via the graphical user interface 604 of the computing device 602.

In this example, the event report may include a display of the listing of tracked events 606 showing various events and statistics that have been tracked for a user across one or multiple gaming applications and across one or multiple computing platforms. As shown in FIG. 6A, the listing of tracked events includes an indicated number of instances for each of the tracked events including a number of detected jump actions, a number of races won, a number of team wins, and a number of minutes paused. As noted above, these tracked instances may apply to detected events across any number of gaming applications and across multiple gaming devices.

In one or more embodiments, the event report includes interactive features that enables an individual to drill-down and view information associated with the tracked instances. For example, FIG. 6B illustrates an example listing of sub-events 608 based on a user selecting a "Team Wins" icon as shown in FIG. 6A. Indeed, as shown in FIG. 6B, the event reporting system 108 may include recognizers trained to detect various events corresponding to specific types of races that an individual has won over some period of time.

In this example, the event reporting system 108 may include an event recognizer for each of the different race types (e.g., co-op wins, three-player wins, four-player wins). In addition, or as an alternative, the event reporting system 108 may include a single recognizer trained to detect team wins of any type and the event analysis system 114 may determine the various subcategories of wins based on additional information collected in connection with each of the tracked instances of the event.

It will be appreciated that the event reporting system 108 may implement event recognizers in a variety of ways to identify the various sub-categories of event instances as shown in FIG. 6B. For example, as mentioned above, the event reporting system 108 may implement a separate event recognizer trained to detect individual types of team wins (e.g., two-player wins, three-player wins). In one or more embodiments, the event reporting system 108 may combine output signals from independent event recognizers, such as a first event recognizer trained to detect "wins" generally and a second one or more event recognizers trained to detect instances in which a user plays on teams of various sizes. Where these event recognizers may have been trained individually and based on different individual requests, the event analysis system 114 may utilize outputs from each of these recognizers to generate a comprehensive event report including combined events as shown in FIG. 6B showing team wins of different team sizes.

In another example, FIG. 6C shows an example listing of events 610 based on a user selecting the number of minutes paused icon from the first listing of events 606 shown in FIG. 6A. In this example, the event report may break down the total number of minutes paused between different gaming applications. In this way, the user of the computing device 602 may view more detailed information associated with the total amount of time paused with respect to individual applications and/or platforms. While not shown in FIG. 6C, in one or more embodiments, the user of the computing device 602 may further drill down on the respective events within the specific gaming applications. For example, in one or more embodiments a user may view a graph or other information generated by the event analysis system 114 to provide further information associated with the detected pause events for the individual gaming applications.

Figure 7:
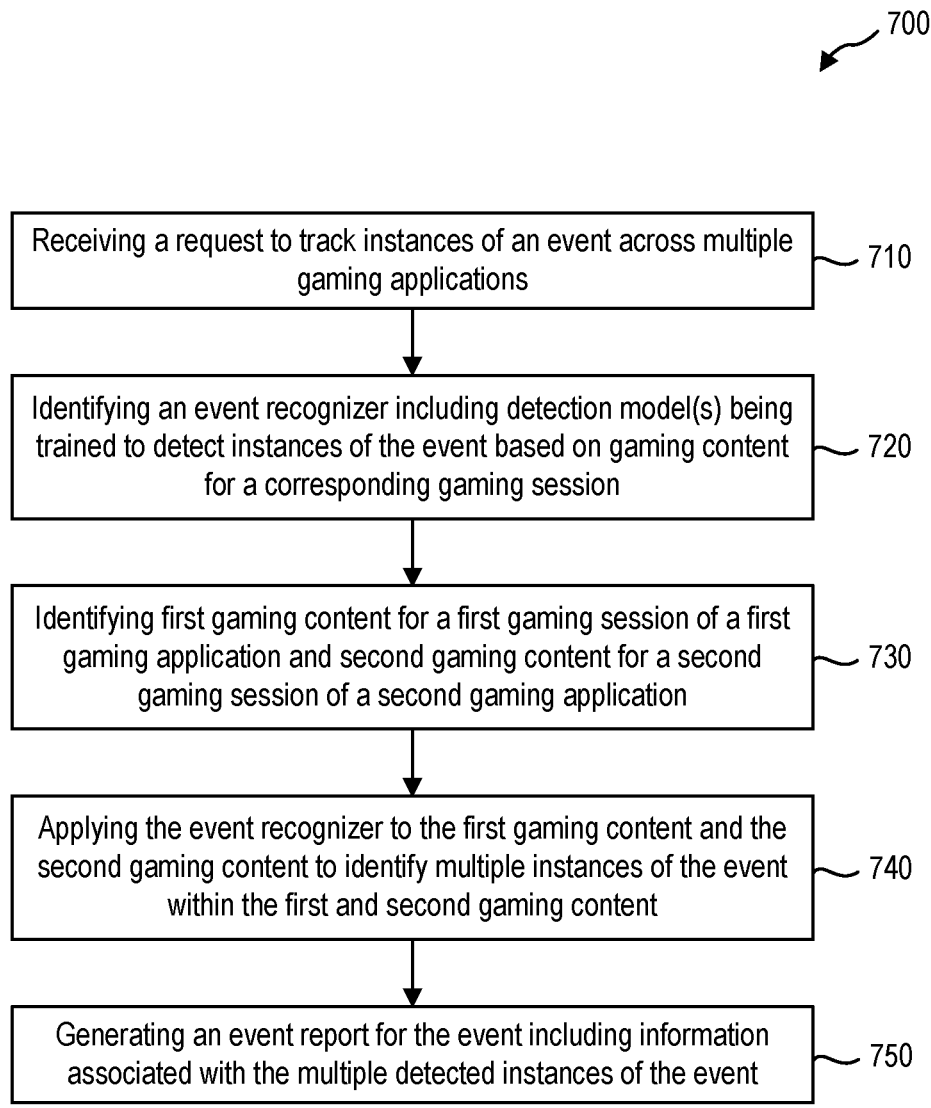
FIG. 7 illustrates an example series of acts for tracking in-game events across a plurality of gaming applications in accordance with one or more embodiments.
Figure 8:
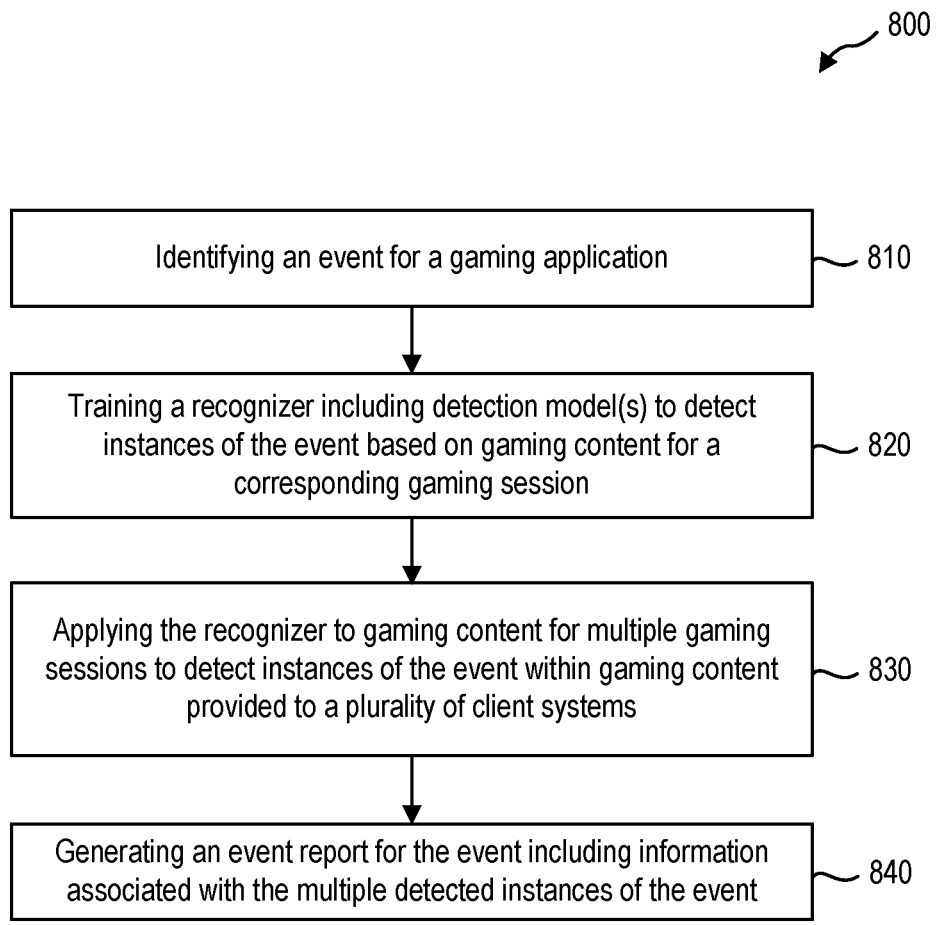
FIG. 8 illustrates an example series of acts for tracking in-game events for a plurality of users of a gaming application in accordance with one or more embodiments.

Turning now to FIGS. 7-8, these figures illustrate example flowcharts including series of acts for detecting in-game events and generating event reports based on the detected events. While FIGS. 7-8 illustrate acts according to one or more embodiments, alternative embodiments may omit, add to, reorder, and/or modify any of the acts shown in FIGS. 7-8. Moreover, one or more of the individual features and functionalities described in connection with individual acts or series of acts in connection with FIGS. 7-8 may similarly apply to other embodiments and examples described herein. The acts of FIGS. 7-8 can be performed as part of a method. Alternatively, a non-transitory computer-readable medium can include instructions that, when executed by one or more processors, cause a computing device to perform the acts of FIGS. 7-8. In still further embodiments, a system can perform the acts of FIGS. 7-8.

FIG. 7 illustrates a series of acts 700 related to detecting instances of an event across a plurality of gaming applications and generating an event report including information associated with the detected event instances. As shown in FIG. 7, the series of acts 700 includes an act 710 of receiving a request to track instances of an event across multiple gaming applications. For example, in one or more embodiments, the act 710 involves receiving a request to track instances of an event, the event being associated with an in-game occurrence within gaming sessions across a plurality of gaming applications.

As further shown, the series of acts 700 may include an act 720 of identifying an event recognizer including detection model(s) being trained to detect instances of the event based on gaming content for a corresponding gaming session. For example, in one or more embodiments, the act 720 may involve identifying a first event recognizer being trained to detect instances of the event, the first event recognizer including one or more detection models that are trained to output one or more signals associated with occurrence of a given instance of the event based on gaming content for a corresponding gaming session.

As further shown, the series of acts 700 may include an act 730 of identifying first gaming content for a first gaming session of a first gaming application and second gaming content for a second gaming session of a second gaming application. For example, in one or more embodiments, the act 730 involves identifying first gaming content including first video content for a first gaming session of a first gaming application and second gaming content including second video content for a second gaming session of a second gaming application where the first video content and the second video content are provided to a client system by gaming servers of a cloud computing system. In one or more embodiments, the first gaming application and the second gaming application are associated with different gaming titles corresponding to different publishers.

As further shown, the series of acts 700 may include an act 740 of applying the event recognizer to the first gaming content and the second gaming content to identify multiple instances of the event within the first and second gaming content. For example, in one or more embodiments, the act 740 involves applying the first event recognizer to the first gaming content and the second gaming content to identify a plurality of instances of the event within the first gaming content and the second gaming content.

As further shown, in one or more embodiments, the series of acts 700 includes an act 750 of generating an event report for the event including information associated with the multiple detected instances of the event. For example, in one or more embodiments, the act 750 involves generating an event report for the event, the event report including information associated with the plurality of instances of the event detected by the first event recognizer.

In one or more embodiments, the one or more detection models are trained to output one or more signals associated with occurrence of the given instance of the event based on gaming content including video content and one or more of audio content or controller inputs for the corresponding gaming session. In one or more embodiments, the first event recognizer includes a first model being trained to output a first signal associated with a first detectable signal within gaming content. The first event recognizer may further include a second model being trained to output a second signal associated with a second detectable signal within gaming content where detection of the given instance of the event is based on a combination of the first detectable signal and the second detectable signal. In one or more embodiments, the models include machine learning models being trained to evaluate portions of video frames from the gaming content for the corresponding gaming session to generate a prediction that the given instance of the event occurred in connection with the video frames.

In one or more embodiments, the series of acts 700 includes identifying a plurality of co-users of the cloud computing system associated with a user of the client system. The series of act 700 may additionally include applying the first event recognizer to gaming sessions for the plurality of co-users of the cloud computing system to detect instances of the event within gaming sessions of the first gaming application or the second gaming application for the plurality of co-users. In one or more embodiments, the event report includes information associated with instances of the event detected in connection with gaming sessions for the plurality of co-users.

In one or more embodiments, the first event recognizer is trained to detect instances of the event based on area of interest parameters. For example, the first event recognizer may be trained to detect instances of the event based on a first area of interest (AOI) parameter indicating a first portion of gaming content that the first event recognizer is trained to selectively analyze in detecting instances of the event in connection with gaming sessions for the first gaming application. The first event recognizer may further be trained to detect instances of the event based on a second AOI parameter indicating a second portion of gaming content that the first event recognizer is trained to selectively analyze in detecting instances of the event in connection with gaming sessions for the second gaming application. In one or more embodiments, applying the first event recognizer to the first gaming content and the second gaming content includes applying the one or more detection models to the first portion of the gaming content for gaming sessions associated with the first gaming application and applying the one or more detection models to the second portion of the gaming content for gaming sessions associated with the second gaming application.

FIG. 8 illustrates another series of acts 800 related to training an implementing an event recognizer to detect instances of an event across a plurality of gaming sessions for a plurality of end-users. For example. As shown in FIG. 8, the series of acts 800 may include an act 810 of identifying an event for a gaming application. For instance, in one or more embodiments, the act 810 may involve identifying an event for a gaming application, the event being associated with an in-game occurrence within gaming sessions for the gaming application. In one or more embodiments, the in-game occurrence refers to an unexpected in-game occurrence including one or more of an in-game defect, an in-game exploit, or an in-game artifact presented within the gaming sessions for the gaming application.

As further shown in FIG. 8, the series of acts 800 may include an act 820 of training a recognizer including detection model(s) to detect instances of the event based on gaming content for a corresponding gaming session. For example, in one or more embodiments, the act 820 may involve causing a first event recognizer to be trained to detect instances of the event, the first event recognizer including one or more detection models that are trained to output one or more signals associated with occurrence of a given instance of the event based on gaming content for a corresponding gaming session. In one or more embodiments, the one or more detection models include machine learning models being trained to evaluate portions of video frames from the gaming content for the corresponding gaming session to generate a prediction that the given instance of event occurred in connection with the video frames.

As further shown in FIG. 8, the series of acts 800 may include an act 830 of applying the recognizer to gaming content for multiple gaming sessions to detect instances of the event within gaming content provided to a plurality of client systems. For example, in one or more embodiments, the act 830 involves applying the first event recognizer to gaming content for a plurality of gaming sessions to detect a plurality of instances of the event within the gaming content for the plurality of gaming sessions where the gaming content for the plurality of gaming sessions includes video content provided to a plurality of client systems by gaming servers of a cloud computing system.

As further shown in FIG. 8, the series of acts 800 may include an act 840 of generating an event report for the event including information associated with the multiple detected instances of the event. For example, in one or more embodiments, the act 840 may involve generating an event report for the event, the event report including information associated with the plurality of instances of the event detected by the first event recognizer. In one or more embodiments, the event report includes an indicated frequency of the event within the plurality of gaming sessions for the gaming application.

In one or more embodiments, the gaming content associated with the plurality of gaming sessions includes copies of gaming content for the plurality of gaming sessions previously streamed to the plurality of client systems. In one or more embodiments, the gaming content further includes one or more of audio content and controller inputs for the plurality of gaming sessions.

In one or more embodiments, identifying the event includes receiving one or more reports from end-users of the cloud computing system indicating instances of the event. Further, in one or more embodiments, the acts of causing the first event recognizer to be trained to detect instances of the event is based on receiving the one or event more reports from the end-users of the cloud computing system.

Figure 9:
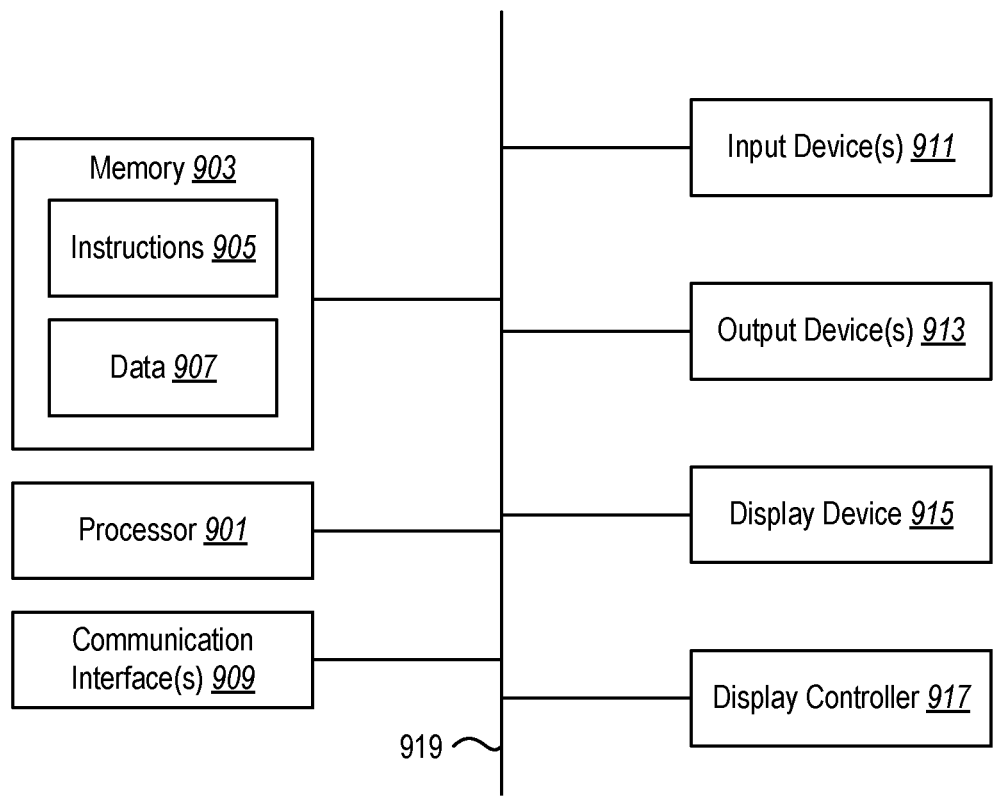
FIG. 9 illustrates certain components that may be included within a computer system.

FIG. 9 illustrates certain components that may be included within a computer system 900. One or more computer systems 900 may be used to implement the various devices, components, and systems described herein.

The computer system 900 includes a processor 901. The processor 901 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a request to track instances of an event, the event being associated with a type of in-game occurrence within gaming sessions across a first gaming application and a second gaming application;
   identifying a first event recognizer being trained to detect instances of the event, the first event recognizer including a first machine learning model, the first machine learning model being trained to output one or more signals associated with occurrence of a given instance of the event based on gaming content for a corresponding gaming session;
   identifying first gaming content of the first gaming application including first video content for a first gaming session of the first gaming application and second gaming content of the second gaming application including second video content for a second gaming session of the second gaming application, wherein the first video content and the second video content are provided to a client system by gaming servers of a cloud computing system;
   applying the first machine learning model to both the first gaming content and the second gaming content to identify one or more instances of the event within the first gaming content and one or more instances of the event within the second gaming content; and
   generating an event report for the event, the event report including information associated with the plurality of instances of the event detected by the first machine learning model.

2. The method of claim 1, wherein the first machine learning model is trained to output one or more signals associated with occurrence of the given instance of the event based on the gaming content comprising video content and one or more of audio content or controller inputs for the corresponding gaming session.

3. The method of claim 1, wherein the first event recognizer further comprises:
   a second machine learning model being trained to output a second signal associated with a second detectable signal within the gaming content for the corresponding gaming session, wherein detection of the given instance of the event is based on a combination of the first detectable signal and the second detectable signal.

4. The method of claim 1, wherein the first machine learning model is configured to evaluate select portions of video frames from the gaming content for the corresponding gaming session to generate a prediction that the given instance of the event occurred in connection with the video frames.

5. The method of claim 1, further comprising:
   identifying a plurality of co-users of the cloud computing system associated with a user of the client system; and
   applying the first event recognizer to gaming sessions for the plurality of co-users of the cloud computing system to detect instances of the event within gaming sessions of the first gaming application or the second gaming application for the plurality of co-users.

6. The method of claim 5, wherein the event report further includes information associated with instances of the event detected in connection with gaming sessions for the plurality of co-users.

7. The method of claim 5, wherein the plurality of co-users includes one or more indicated friends of a user of the client system, teammates of the user of the client system, or public users having an associated history of gaming sessions for the first gaming application or the second gaming application.

8. The method of claim 1, wherein the first gaming application and the second gaming application are associated with different gaming titles corresponding to different publishers.

9. The method of claim 1 wherein the first event recognizer is trained to detect instances of the event based on:
- a first area of interest (AOI) parameter indicating a first portion of gaming content that the first event recognizer is trained to selectively analyze in detecting instances of the event in connection with gaming sessions for the first gaming application, the first portion including a first defined region of respective video frames of video content from the first gaming application; and
- a second AOI parameter indicating a second portion of gaming content that the first event recognizer is trained to selectively analyze in detecting instances of the event in connection with gaming sessions for the second gaming application, the second portion including a second defined region of respective video frames of video content from the second gaming application.

10. The method of claim 9, wherein applying the first event recognizer to the first gaming content and the second gaming content includes:
- applying the one or more detection models to the first portion of the gaming content for gaming sessions associated with the first gaming application; and
- applying the one or more detection models to the second portion of the gaming content for gaming sessions associated with the second gaming application.

11. A method, comprising:
- identifying an event for a gaming application, the event being associated with an in-game occurrence within gaming sessions for the gaming application;
- causing a first event recognizer to be trained to detect instances of the event, the first event recognizer including one or more detection models that are trained to output one or more signals associated with occurrence of a given instance of the event based on gaming content for a corresponding gaming session;
- applying the first event recognizer to a select portion of gaming content for a plurality of gaming sessions to detect a plurality of instances of the event within the gaming content for the plurality of gaming sessions, wherein the select portion of gaming content for the plurality of gaming sessions includes a defined region within respective video frames of video content provided to a plurality of client systems by gaming servers of a cloud computing system; and
- generating an event report for the event, the event report including information associated with the plurality of instances of the event detected by the first event recognizer.

12. The method of claim 11, the in-game occurrence being an unexpected in-game occurrence including one or more of an in-game defect, an in-game exploit, or an in-game artifact presented within the gaming sessions for the gaming application.

13. The method of claim 11, wherein the gaming content for the plurality of gaming sessions includes copies of gaming content for the plurality of gaming sessions previously streamed to the plurality of client systems.

14. The method of claim 13, wherein the gaming content for with the plurality of gaming sessions further includes one or more of audio content and controller inputs for the plurality of gaming sessions.

15. The method of claim 11, wherein identifying the event includes receiving one or more reports from end-users of the cloud computing system indicating instances of the event, and wherein causing the first event recognizer to be trained to detect instances of the event is based on receiving the one or more reports from the end-users of the cloud computing system.

16. The method of claim 11, wherein the one or more detection models include machine learning models being trained to evaluate portions of video frames from the gaming content for the corresponding gaming session to generate a prediction that the given instance of event occurred in connection with the video frames.

17. The method of claim 1, wherein the event report includes an indicated frequency of the event within the plurality of gaming sessions for the gaming application.

18. A system, including:
- one or more processors;
- memory in electronic communication with the one or more processors; and
- instructions stored in the memory, the instructions being executable by the one or more processors to:
  - receive a request to track instances of an event, the event being associated with a type of in game occurrence within gaming sessions across a first gaming application and a second gaming application;
  - identify a first event recognizer being trained to detect instances of the event, the first event recognizer including a first machine learning model, the first machine learning model being trained to output one or more signals associated with occurrence of a given instance of the event based on gaming content for a corresponding gaming session;
  - identify first gaming content of the first gaming application including first video content for a first gaming session of the first gaming application and second gaming content of the second gaming application including second video content for a second gaming session of the second gaming application, wherein the first video content and the second video content are provided to a client system by gaming servers of a cloud computing system;
  - apply the first machine learning model to both the first gaming content and the second gaming content to identify one or more instances of the event within the first gaming content and one or more instances of the event within the second gaming content; and
  - generate an event report for the event, the event report including information associated with the plurality of instances of the event detected by the first machine learning model.

19. The system of claim 18, wherein the first machine learning model is trained to output one or more signals associated with occurrence of the given instance of the event based on gaming content comprising video content and one or more of audio content or controller inputs for the corresponding gaming session.

20. The system of claim 18, wherein the first event recognizer includes:
- a first area of interest (AOI) parameter indicating a first portion of gaming content that the first event recognizer is trained to selectively analyze in detecting instances of the event in connection with gaming sessions for the first gaming application, the first portion including a first defined region of respective video frames of video content from the first gaming application; and
- a second AOI parameter indicating a second portion of gaming content that the first event recognizer is trained to selectively analyze in detecting instances of the event in connection with gaming sessions for the second gaming application, the second portion including a second defined region of respective video frames of video content from the second gaming application.

* * * * *